US008016679B2

(12) United States Patent
Steil et al.

(10) Patent No.: US 8,016,679 B2
(45) Date of Patent: Sep. 13, 2011

(54) UNIVERSAL GAME MODULES FOR MESSAGE COMMUNICATION BETWEEN AT LEAST TWO CASINO CONTROLLERS

(75) Inventors: Rolland Steil, Las Vegas, NV (US); Clyde Ruckle, Las Vegas, NV (US); John Lord, Las Vegas, NV (US)

(73) Assignee: IGT, Reno, NV (US)

( * ) Notice: Subject to any disclaimer, the term of this patent is extended or adjusted under 35 U.S.C. 154(b) by 1240 days.

(21) Appl. No.: 11/387,544

(22) Filed: Mar. 22, 2006

(65) Prior Publication Data

US 2006/0166735 A1 Jul. 27, 2006

Related U.S. Application Data

(62) Division of application No. 10/225,622, filed on Aug. 21, 2002, now Pat. No. 7,255,645.

(51) Int. Cl.
*A63F 13/12* (2006.01)

(52) U.S. Cl. ........... 463/42; 463/27; 463/40; 273/138.2; 273/460; 709/203; 713/170; 902/23

(58) Field of Classification Search .............. 463/16–23, 463/25–33, 39–43; 273/138.1, 139, 138.2, 273/141 A, 454–456, 460; 709/203–207, 709/FOR. 113; 713/1, 100, 150, 155, 170, 713/176, 182–184, 186–189, 300, 375, 400, 713/500, 600; 902/2–3, 23, 38, 40
See application file for complete search history.

(56) References Cited

U.S. PATENT DOCUMENTS 4,636,951 A * 1/1987 Harlick ........................... 463/25
5,116,055 A 5/1992 Tracy
5,564,700 A 10/1996 Celona
5,664,998 A 9/1997 Seelig et al.
5,674,128 A * 10/1997 Holch et al. .................... 463/42
5,675,721 A * 10/1997 Freedman et al. ............ 345/502
5,743,800 A 4/1998 Huard et al.
5,766,076 A * 6/1998 Pease et al. ...................... 463/27
5,833,540 A * 11/1998 Miodunski et al. ............. 463/42
5,885,158 A 3/1999 Torango et al.
5,970,143 A * 10/1999 Schneier et al. .............. 713/181
6,039,648 A * 3/2000 Guinn et al. ..................... 463/16
6,077,162 A * 6/2000 Weiss .............................. 463/26
6,089,980 A * 7/2000 Gauselmann ................... 463/27

(Continued)

OTHER PUBLICATIONS radio electronics.com. RS-422 serial transmission [online], [retrieved Feb. 22, 2006]. Retrieved from the Internet <URL: http://www.radio-electronics.com/info/telecommunications_networks/networking/rs422/rs...>.

(Continued)

*Primary Examiner* — Arthur O. Hall
(74) *Attorney, Agent, or Firm* — Armstrong Teasdale LLP

(57) ABSTRACT

Two-way communications between casino games and diverse master controllers using a universal game module there between allows routing event messages with standard protocols. The universal game module with a computer processor, circuitry, connection ports, interfaces and protocols allows the communications by evaluating, prioritizing, polling and routing communications. A jackpot group of differing games is possible because the win cycles of the various games can be equalized. The volatility of the games in the group is increased by randomly segregating a percentage of the machines to be eligible to win the progressive jackpot for a limited time period. A life changing jackpot is thus payable for a variety of games in a casino on a relatively frequent basis.

6 Claims, 8 Drawing Sheets

U.S. PATENT DOCUMENTS

| | | | | |
|---|---|---|---|---|
| 6,110,043 | A * | 8/2000 | Olsen | 463/27 |
| 6,146,270 | A | 11/2000 | Huard et al. | |
| 6,210,275 | B1 | 4/2001 | Olsen | |
| 6,217,448 | B1 * | 4/2001 | Olsen | 463/25 |
| 6,224,484 | B1 | 5/2001 | Okuda et al. | |
| 6,231,445 | B1 * | 5/2001 | Acres | 463/42 |
| 6,251,014 | B1 * | 6/2001 | Stockdale et al. | 463/16 |
| 6,293,865 | B1 * | 9/2001 | Kelly et al. | 463/16 |
| 6,312,333 | B1 * | 11/2001 | Acres | 463/25 |
| 6,364,768 | B1 * | 4/2002 | Acres et al. | 463/25 |
| 6,375,567 | B1 * | 4/2002 | Acres | 463/25 |
| 6,409,602 | B1 * | 6/2002 | Wiltshire et al. | 463/42 |
| 6,511,377 | B1 * | 1/2003 | Weiss | 463/25 |
| 6,575,829 | B2 * | 6/2003 | Coleman et al. | 463/20 |
| 6,607,441 | B1 * | 8/2003 | Acres | 463/25 |
| 6,645,075 | B1 * | 11/2003 | Gatto et al. | 463/25 |
| 6,712,698 | B2 * | 3/2004 | Paulsen et al. | 463/30 |
| 6,714,967 | B1 * | 3/2004 | Horvitz | 709/206 |
| 6,722,985 | B2 * | 4/2004 | Criss-Puszkiewicz et al. | 463/29 |
| 6,749,510 | B2 * | 6/2004 | Giobbi | 463/42 |
| 6,887,154 | B1 * | 5/2005 | Luciano et al. | 463/26 |
| 6,916,244 | B2 * | 7/2005 | Gatto et al. | 463/25 |
| 6,997,803 | B2 * | 2/2006 | LeMay et al. | 463/20 |
| 7,056,215 | B1 | 6/2006 | Olive | |
| 7,108,603 | B2 | 9/2006 | Olive | |
| 7,127,069 | B2 * | 10/2006 | Nguyen | 380/278 |
| 7,285,048 | B2 * | 10/2007 | Karmarkar | 463/42 |
| 7,287,057 | B2 * | 10/2007 | Lagarde et al. | 709/206 |
| 7,470,196 | B1 * | 12/2008 | Joshi | 463/42 |
| 7,640,300 | B2 * | 12/2009 | Wohlgemuth et al. | 709/204 |
| 7,690,043 | B2 * | 3/2010 | Saunders et al. | 726/27 |
| 7,731,586 | B2 * | 6/2010 | Letovsky et al. | 463/20 |
| 7,753,790 | B2 * | 7/2010 | Nguyen et al. | 463/42 |
| 7,931,533 | B2 * | 4/2011 | LeMay et al. | 463/29 |
| 2002/0156903 | A1 * | 10/2002 | Bach Corneliussen | 709/228 |
| 2002/0177483 | A1 | 11/2002 | Cannon | |
| 2003/0139190 | A1 * | 7/2003 | Steelberg et al. | 455/456 |
| 2005/0079911 | A1 | 4/2005 | Nakatsu | |

OTHER PUBLICATIONS radio electronics.com. TS-232 tutorial [online], [retrieved Jan. 25, 2006]. Retrieved from the Internet <URL: http://www.radio-electronics.com/info/telecommunications-networks/netw...>.

Acres Gaming. Acres Gaming Receives Approval for Wizard Slot Accounting System [online], [retrieved Feb. 20, 2006]. Retrieved from the Internet <URL: http://www.gamingfloor.com/pressrel/Press_acres.htm>.

Gaming Standards Association. Standards [online], [retrieved Feb. 20, 2006]. Retrieved from the Internet <URL: http://www.gamingstandards.com/standards.html>.

IGT. SAS Protocol [online], [retrieved Feb. 20, 2006]. Retrieved from the Internat <URL: http://www.igt.com/Content/base.asp-?pid=26.300&bhcp=1>.

Mikohn Gaming Corporation, CasinoLink Single and Multi-Site Gaming Solutions, 4 pgs, Las Vegas, Nevada.

* cited by examiner

UNIVERSAL GAME MODULES FOR MESSAGE COMMUNICATION BETWEEN AT LEAST TWO CASINO CONTROLLERS

This application is a divisional of U.S. patent application Ser. No. 10/225,622, filed Aug. 21, 2002, and issued as U.S. Pat. No. 7,255,645, which is hereby incorporated by reference and is assigned to the assignee of the present invention.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to and, in particular, to improvements in the methods and apparatus for a gaming system having a plurality gaming machines each often eligible for progressive jackpot although their rule of play and wagers can be different.

2. Description of Related Art Including Information Disclosed Under 37 CFR 1.97 and 1.98

Progressive jackpot gaming systems have a plurality of gaming machines are linked together to form a progressive system. A percentage of game play on each of the gaming machines funds the progressive jackpot value that continually increases until a win or hit occurs at one of the linked machines. The progressive jackpot is paid out to the machine that hit jackpot and the system resets, usually to a base jackpot value, and then again begins incrementing the jackpot value based on game play. This procedure then repeats. Calculation of the progressive jackpot value and the monitoring of hit jackpots are carried out using a progressive controller that links the gaming machines. The progressive controller monitors the coin/pulse and jackpot/pulse information of each gaming machine to determine the monetary amount being played and if a jackpot has been hit. The controller increments the progressive jackpot value and displays that.

The progressive controller also monitors jackpot wins so as to acknowledge the winning of the progressive jackpot and, thereafter, to reset the jackpot to the base amount for continued incrementing based on subsequent game play.

It is typical to link only gaming machines of the same type, i.e., those having substantially the same play characteristics, i.e., rules of play and denomination of wager. Thus, the gaming machines on a given link will typically accept the same monetary value or coin for game play, i.e., will be of the same denomination. They also will usually require the same number of coins-in, i.e., the same coins-in to qualify for or buy-into the progressive jackpot. Additionally, the number of games played per win of the progressive jackpot, i.e., the hit frequency, for each machine will be the same. Finally, the percentage of game play applied or contributed to the progressive jackpot will be equal for all machines. By using machines with like denominations, coin-in, hit frequencies, percent to jackpot and other like play characteristics on a progressive link, the progressive system treats players at the different machines on the same basis.

U.S. Pat. No. 5,885,158 has a progressive gaming system configured to run many progressive prizes on one central system. The relationship between progressive group and prize with a particular game is designed so that the odds and bet on a particular game need not be identical throughout a group. Prize definition is in terms of number of coins that are expected to be played between prize hits. Thus the denomination, and minimum number of coins returned to players or odds need not be the same. When a progressive game is designed, the coins bet and odds related to the logic of the game are verified as compatible with the prize definitions coins expected to be played between prize hits. The prize definition is used to validate an association between a particular game and a particular progressive prize. The event that triggers a progressive prize may be unrelated to the events on any game.

U.S. Pat. No. 6,146,270 selects at random an element determining a winner in an auxiliary game. The element can be a players position, or a given card or combination of cards held by participants in the casino, at a table among all tables in the casino, or by a given participant. For example, blackjack players at three different tables may all participate in an auxiliary game. Predetermined prizes (i.e. percentages of the jackpot) are awarded to all participants who have high scoring hands, such as blackjack, twenty-one, or twenty with more than four cards. In addition to these prizes, a card is selected at random, and any participant (winner or loser) having this card in his hand wins a prize of a predetermined or randomly decided value. The value of the prize can be increased and it will be awarded to only participants at a randomly selected one of the three tables. Additionally, a given participant can be selected and a single card can be selected as the winning card for the progressive win.

Progressive gaming systems have typically been organized such that any gaming terminal providing a chance at a progressive prize is coupled to a central computer that calculates the total amount of the progressive prize. The central computer was used for one progressive game and a progressive prize if there were two progressive games, each would have a different central computer and no single gaming terminal was eligible for participation in the two different progressive games. Numerous central computer systems were required if several progressive games were desired each with its communications system. The cost of providing such multiple computers and communications systems limited the availability of progressive gaming systems.

Each gaming terminal providing eligibility for a given progressive prize was configured to have the same odds of winning the progressive prize and to require the same amount of bet or wager for a given chance at the progressive prize.

U.S. Pat. No. 5,116,055 has different denominations and hit frequencies for gaming machines in a progressive gaming system. Several parameters of the system, including the percent-to-jackpot ratio of the various gaming machines, could be provided with non-integral values. Gaming devices had the same odds and amount of bet for a chance at a progressive prize. U.S. Pat. No. 5,743,800 provides an auxiliary game in which a random selection of players or card combinations is selected by a master controller to win a fixed amount or percentage amount of a progressive jackpot.

There is a need for a progressive gaming system able to run many progressive prizes, unrestricted to the same odds and amount of bet for a chance at a progressive prize and/or which can provide an event trigger allowing the win of a progressive related to the rules of game play. This will result in a more flexible progressive gaming system at a reasonable cost.

SUMMARY OF THE INVENTION

Mikohn Gaming Corporation, the assignee of the present disclosure, provides a wide variety of progressive system hardware and software. These systems range from a single machine type to a complete statewide system that allows the user to connect to several locales throughout a defined geographic area. Herein a Local Area Progressive incorporates a large progressive jackpot also known as, a life changing award, within a four-wall casino and allows the player to be eligible for the award even while playing his/her favorite gaming machine. The preferred approach is to group slot machines of varied games in a progressive jackpot system but even progressive table games could be used with the disclosed system as a group or perhaps combined with slot machines so long as they are in the same local area progressive jackpot system. The casino games, herein referred to a electronic gaming machines, could be of a standalone game such an individual slot machine. It could be a standalone slot machine with a bonus game. It could also be a standalone slot machine with a bonus game that includes elements of skill or strategy. It could also include reel slot machines or video versions of gaming machines. It could also include any of these electronic gaming machines connected together to include shared jackpots or progressive jackpots.

The present disclosure provides for a single central system that is coupled to a plurality of gaming machines so one or more gaming machines are eligible progressive jackpots. Unlike previous systems with all participating gaming terminals having a specific value of odds, denomination and amount of bet or which provided for non-integral values of certain parameters, herein there may be no criteria for a given gaming machine to be in the local area progressive jackpot.

One approach to this progressive system may include equalization of the win cycle of a particular slot machine game on the basis of its relative win cycle frequency. That is to say that different slot game machines each have win frequencies as a number of cycles of play set as a function of the inherent return from that type of game. Thus, to be fair the different games played on the various slot machines grouped in the preferred progressive jackpot system must be equalized. The particular win cycle of any given slot machine game must be multiplied by a factor taking into account the contribution to the progressive jackpot pool of that particular game relative to the contribution of each other type of slot game in the group of progressive machines.

Thus the win cycle for any particular kind of slot machine game will be a function of its eligibility (from that particular slot machine game) to the progressive jackpot. The multiplication factor thus equalizing the chance to win the jackpot on the basis of an on average relative jackpot contribution. That recognizes that over time all slot machines games of a particular type will act about the same. Equalization can likewise apply to slot machines of different denominations, volatility, with or without bonus games or strategy play or any other parameter such as skill levels, multipliers and indexes. All slot machines have some typical win cycle frequency figure that is on average or over time but win cycle frequencies vary randomly, else players would sit in the casinos and count cycles then play only at the precipitous moment to walk away with the win.

Another difficulty with progressive slot machines is a result of the very small amounts contributed to the jackpot pool, i.e., tenths of a percent. While that can over time lead to big jackpot amounts the frequency of the progressive win cycle, being inversely proportional to the amount collected for pay out, contribution is very small and accumulation is very slow. Win cycle frequency should be high to attract players and maintain their interest in play. To have frequent win cycles and high jackpots something more has to be provided in addition to having different games in the local area progressive. By randomly selecting a small percentage of all the slot machines in the progressive group and making only those eligible for the jackpot, the overall frequency of jackpot payouts can go up while the amount of pay out remains relatively high. Thus, jackpot pay out amounts is a function of the number of slot machines eligible to achieve a win. The random selection of which slot machines are eligible makes fair the use of this technique to maintain good win frequencies and large pay out amounts.

The preferred concept is as follows:

1. All gaming machines within a four-wall casino connect and contribute a percentage of all coin-in from each to one progressive group with up to eight jackpot levels. The percentage of contribution to the progressive jackpots can be variable, i.e., 1/10% to 1/5% (these numbers are for example only).
2. Weighting of each slot machine game is based on type of machine. For example, taking the longest win cycle as your base and weighting all other slot machines in the system setup software to match your base win cycle with a multiplication factor to equalize all the different slot machines to the lowest or longest win cycle. If your base win cycle, major award, is 1 in every 1,000,000 games and that your shortest win cycle is 1 in every 10,000 games, the 10,000 game cycle device would only be eligible for the local area progressive 1/100$^{th}$ of the time to make up for its short win cycle.
3. Select the maximum number of slot machines eligible for the jackpot during a period. For example, make 10% of all slot machines eligible for a jackpot during the local area progressive period. The eligible 10% of the slot machines for each local area progressive period are randomly selected by the system.
4. Setup the maximum number of local area progressive periods allowed during business hours of the casino.
5. To win the local area progressive jackpot the slot machine must have been randomly selected to be eligible and the player must have won during the period of eligibility the major award for that slot machine.

The main advantage to players would be the opportunity to win a large progressive jackpot without the need to play a less desirable slot machine game.

The main advantage to the operator would be the ability to offer a life-changing award to all players within the four-wall casino, thus keeping the patrons interest.

In light of the above description, a number of advantages of the present invention can be seen. The present invention provides the ability to run many progressive prizes on one central system. In the present invention the restrictions, found in previous systems, of forcing machines to have the same odds and amount bet have been removed. Here a new event trigger definition allows the hit of a progressive jackpot to be created by an event related to any particular rules of game play. This system is flexibility, e.g., in the number of progressive games run on a single system, denominations of gaming terminals and games, number of prizes per progressive game.

DETAILED DESCRIPTION OF THE INVENTION

Figure 1:
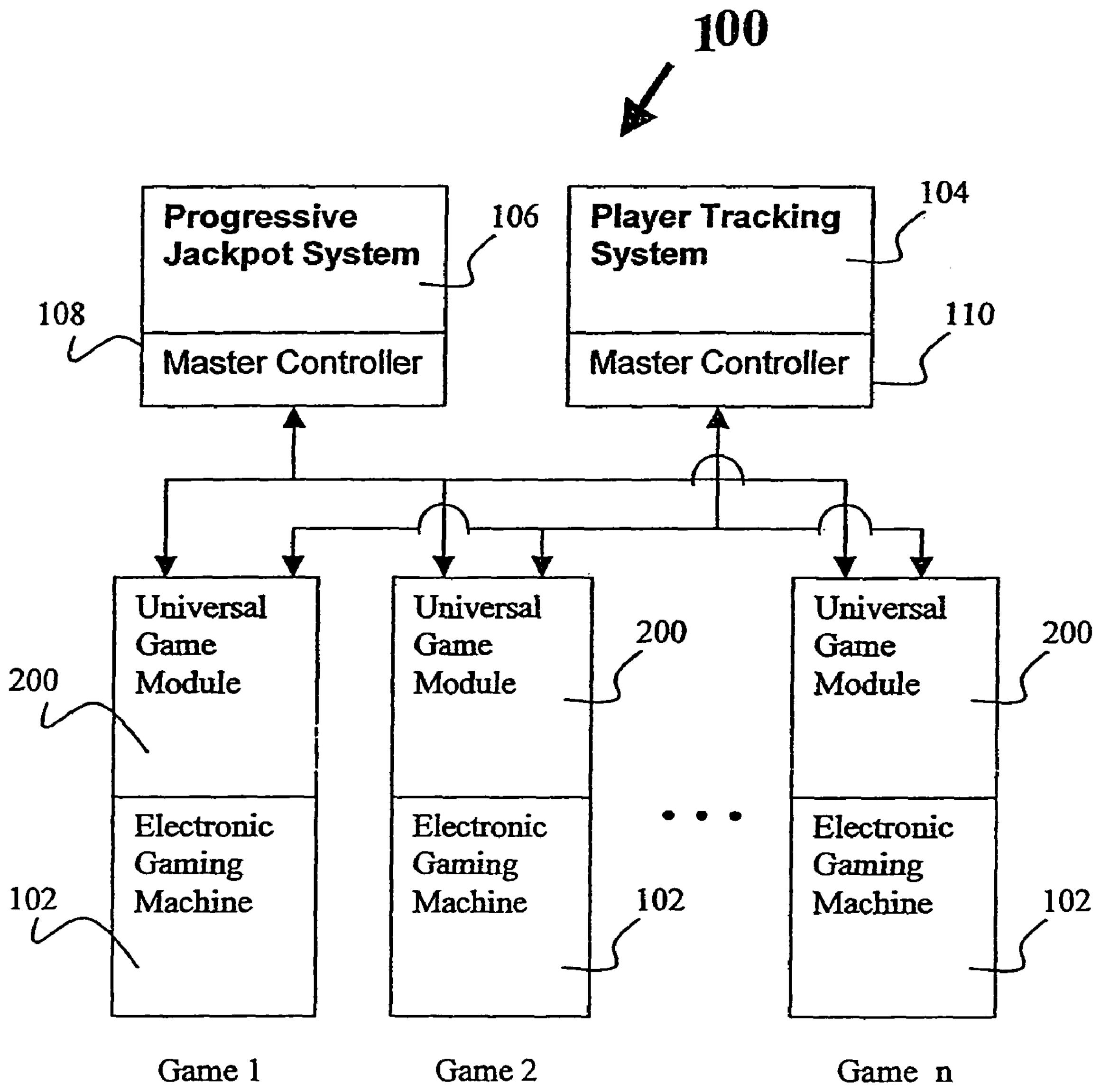
FIG. 1 is a diagram of a typical casino configuration where two casino master controllers are networked to multiple casino electronic gaming machines.

For a variety of reason, not the least important being regulatory requirements, it is necessary to connect casino electronic slot machines to a casino central accounting system herein referred to as a master controller. The casino central accounting system can monitor the activity of the slot machine and provide information to the operator about abnormal conditions. One commercial system is the Slot Accounting System. This system is a proprietary system developed by International Game Technology of Reno, Nev. The communications protocol of the Slot Accounting System is used by other game machine manufactures to interface proprietary systems games and accounting systems. The Gaming Standards Association endorses standards for that communications protocol. The current version of the Slot Accounting System communications protocol is documented in a confidential document that is available upon request from International Game Technology. Skilled artisans are able to utilize the Slot Accounting System communication protocol standards to implement communications between a master control system, such as a slot account system or a progressive jackpot system, and a gaming machine that supported that protocol.

The adoption of a standard communications protocol to interface gaming machines to a control system was a large advance for the gaming industry in that it allowed dissimilar game machines to interface with one control system for accounting purposes. Progressive jackpot system control is between like games and the casino progressive control systems. It became apparent the concept had some serious shortcomings. If a casino wants to run a control system for accounting and for a control system for a progressive jackpot, then the problem arises as to how to interface the two master control systems with one or more games at the same time. Specifically, one major shortcoming was that a second master control system could not interface to a typical casino electronic gaming machine as there is only one physical connector per game for the protocol communication line. A second shortcoming was that a casino electronic gaming machine that had a greater functionally or features could not utilize those functions or features if the communications protocol did not support those functionally or features and there was no way to do so without modifying the each gaming machine to add a second communications line.

The solution to these problems is in an apparatus referred to herein as the universal game module. The universal game module solves the physical connector problem by allowing more than one master control system to communicate through the one existing physical connection on each existing casino electronic gaming machine. It solves the problem of game functionally or feature limits by allowing a separate logical communications path between each electronic gaming machine and one or more additional master control systems each having a master controller.

Within the universal game module there are three possible ways of processing messages depending on the type of message and source of message. The ways of processing are a function of the method of operation of each casino electronic gaming machine and the master controllers rather than the physical attributes of a message. The master controllers inquire or request data by sending general polls and long polls to each casino electronic gaming machine. General polls are sent to the casino electronic gaming machine to obtain event information on a period basis. The casino electronic gaming machines respond to the general polls with a single byte exception code indicating that an event has occurred (e.g., door open, bill accepted, or hand pay pending). Game events, such as a combination of winning symbols, event triggers, beginning and ending of bonus features and other game control indicators can also be communicated to a master controller. When the master controller desires accounting information, such as the casino electronic gaming machine's coin in meter, it issues a long poll requesting the specific data. When responding to any master controller long poll, the casino electronic gaming machine message includes its address, master controller command and requested data among other information. A special message sequence is related to the verification of a casino electronic gaming machine's Read Only Memory (ROM). In this case the master controller issues a ROM signature request. Casino electronic gaming machines are required to continue communications with the master controllers while generating a signature. Once the casino electronic gaming machine has completed generating the signature, it sends the signature to the master controller in response to the next general poll it receives from that master controller. Additionally, some commands from the master controller must be processed on a priority basis. An example of this would be a "disable" or shutdown command. Processing of messages from disparate master controllers to each casino electronic gaming machine creates circumstances wherein priority commands must take precedence over all other processing and wherein longer strings of data responses must be associated with the requesting master controller and wherein timed response events must be monitored.

In operation and referring to FIG. 1 a typical casino network configuration 100 has a number of casino electronic gaming machines 102 linked to a master controller 110 of a player tracking system 104. The player tracking system 104 typically provides such features as game authentication, security, ticketing and game accounting. A second system 106, in this case the Mikohne CasinoLink® Progressive Jackpot system is depicted as also linked to each casino electronic gaming machine 102 through a master controller 108. Both systems, 104 and 106, communicate between their respective master controllers, 108 and 110, and each casino electronic gaming machine 102 with the separate communication networks and different inquires and replies. At each casino electronic gaming machine 102, both master controllers, 108 and 110, physically connect through the existing connection of each gaming machine via the universal game module 200.

In operation, each master controller, 108 and 110, is configured to be unaware of the existence of the other. Notwithstanding the existence of each control system, 104 and 106, each system believes that it is the only system that is communicating to the casino electronic gaming machine 102. Each casino electronic gaming machine 102 responses to each request from the each master control controller, 108 and 110, as if each request came from one source. It is the function of the universal game module 200 to route the flow of messages from each master controller, 108 and 110, to the casino electronic gaming machine 102 and back to each respective master controller, 108 and 110, in such a manner that priority messages are recognized, exception situations are processed correctly and that routine messages are handled in a timely manner.

Figure 2:
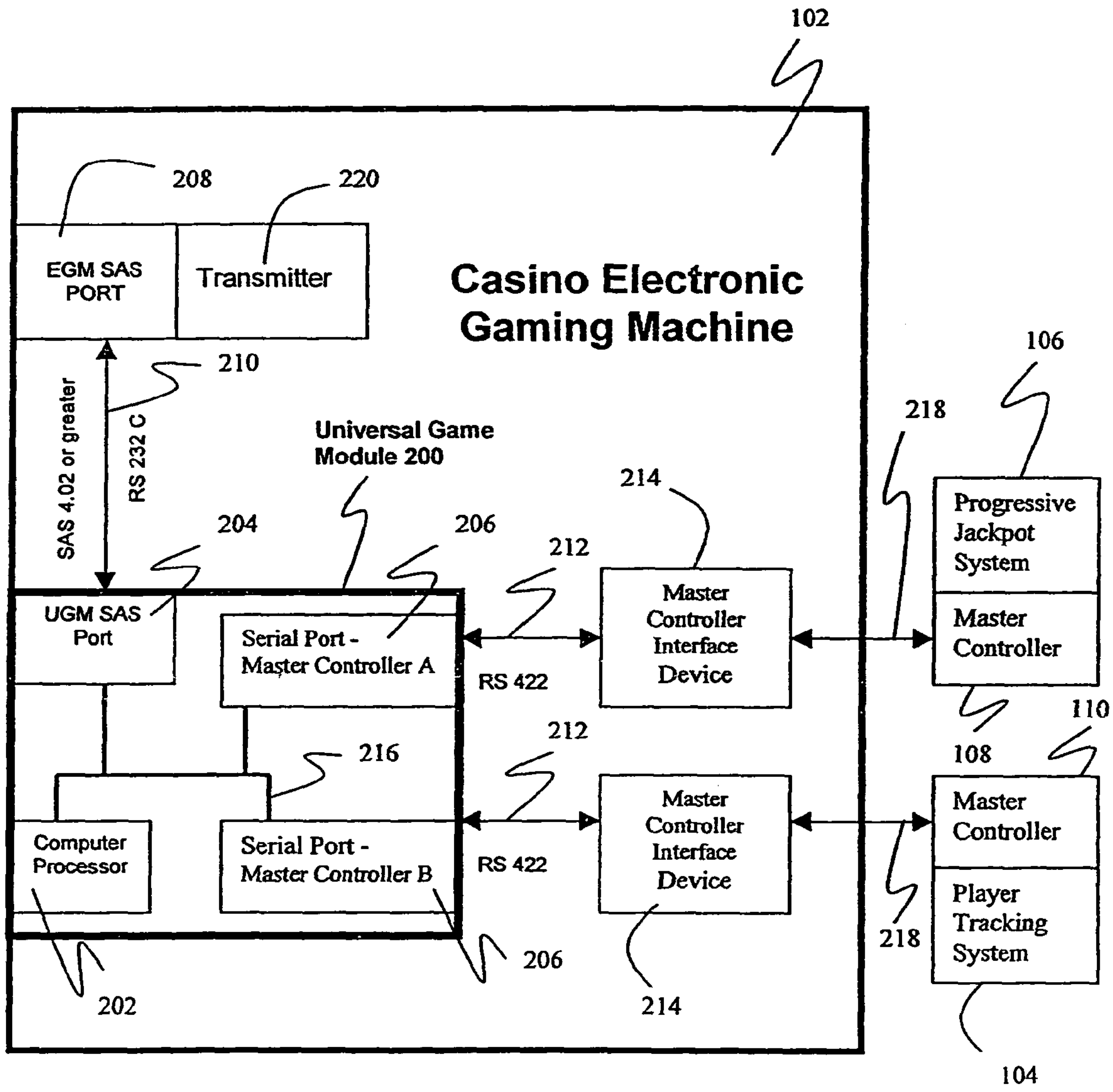
FIG. 2 is a diagram of a typical casino electronic gaming machine with universal game module installed.

In operation and referring to FIG. 2, one universal game module 200 enables concurrent two-way communications between its casino electronic game machine 102 and a plurality of casino master controllers, 108 and 110, so that diverse casino master controllers, 108 and 110, and each electronic gaming machine 102 can communicate event messages. The universal game module 200 is comprised of a computer processor 202 for controlling communications of event messages, a circuit 216 for routing asynchronous gaming event messages and input-output interfaces 204 and 206

The computer processor 202, contains memory with instructions for controlling the event message transfer between each universal game module 200 and each electronic gaming machine 102 and for controlling the event message transfer between the universal game module 200 and each casino master controllers, 108 and 110. The event message transfer protocol meets at least the slot accounting system 4.02 protocol standard.

Circuit 216 in the universal game module 200 connects the computer processor 202 to each of the serial input-output interfaces ports 204 and 206.

Each casino electronic gaming machine 102 typically contains one slot accounting system serial port 208. The universal game module 200 couples the serial input-output port 204 that and the casino electronic gaming machine Slot Accounting System serial port 208 with a connector 210 that complies with Electronic Industry Association RS232C standard. The slot accounting system serial port 208 is coupled to a transmitter 220 within the casino electronic gaming machine 102. The electronic gaming machine 102 transmits game event information to the master controllers 108 and 110 via the slot accounting system serial port 208 by way of the universal game module 200.

In a similar manner the universal game module 200 couples each of the other two serial ports 206 and the respective casino master controller interface boards 214 with connector 212 that complies with Electronic Industry Association RS422 standard. In turn the master controller interface boards 214 are connect to the associated casino master controller, 108 and 110, using the existing internal casino communications networks 218.

Figure 3:
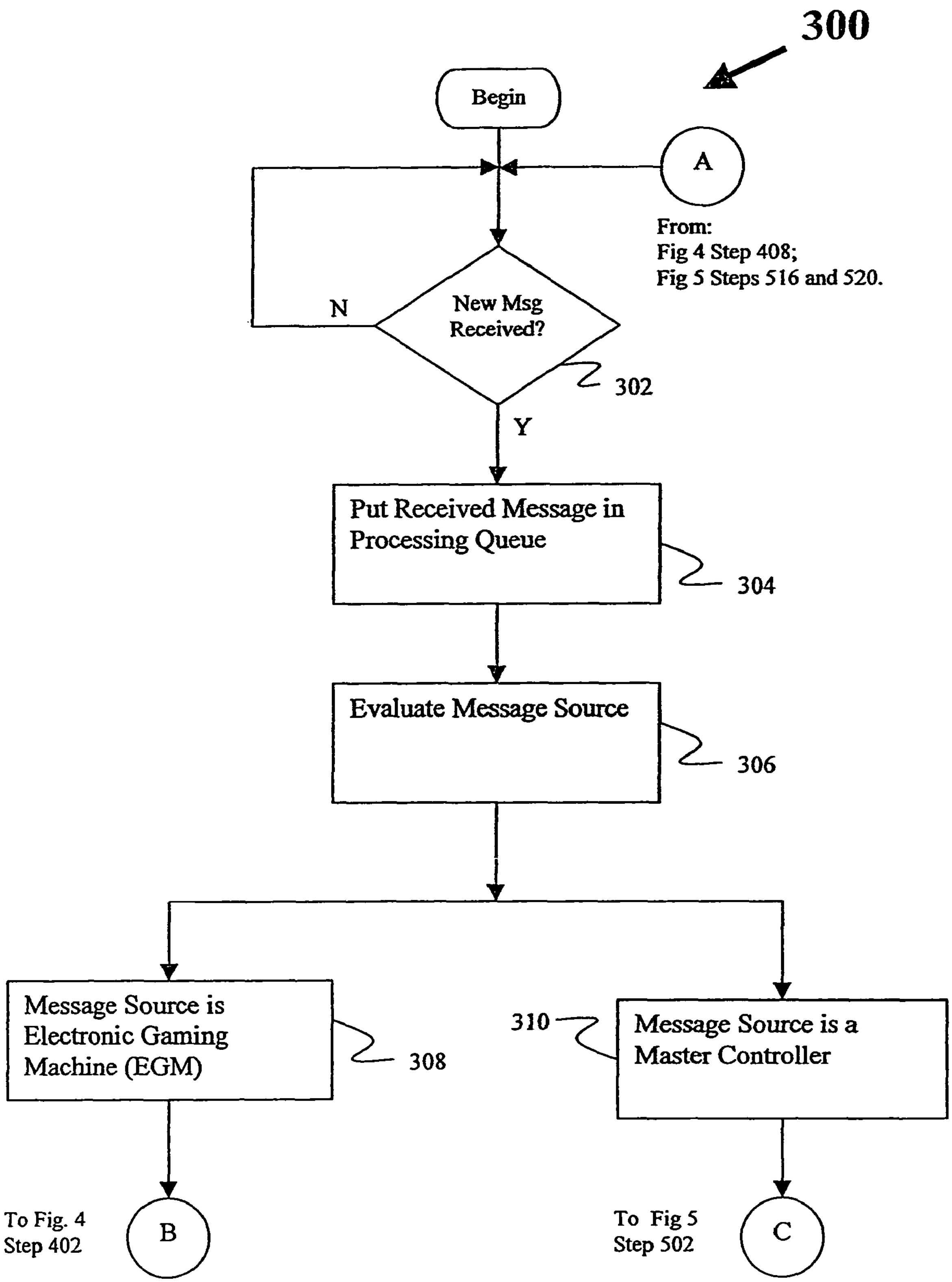
FIG. 3 is a flow diagram of message processing within the universal game module.

In operation and referring to FIGS. 1, 2 and 3, a method for the flow of message processing 300 within the universal game module 200 is depicted. A continuous check for a new message received or message waiting to be processed is done at step 302. When a new message has been received, the message is put into a processing queue shown in block 304. The message is then evaluated to determine the source of the message in step 306. If the message is from casino electronic gaming machine 102 then processing is transferred to that function shown at block 308. If the message is from a casino master controller, 108 and 110, via line 212 in FIG. 2 then processing is transferred to that function as in block 310.

FIGS. 4, 5, 6, 7*a* and 7*b* are functional flow diagrams that depict the communications sequences between a casino electronic gaming machine 102 and the associated master controllers 108 and 110 in operation. For clarity, the message paths as describe in FIGS. 1, 2 and 3 are assumed to be present and are not specifically referred to in the description. Rather the functional flows describe the typical initial actions and subsequence actions of an electronic gaming machine 102 and the associated master controllers 108 and 110 in a casino operation.

Figure 4:
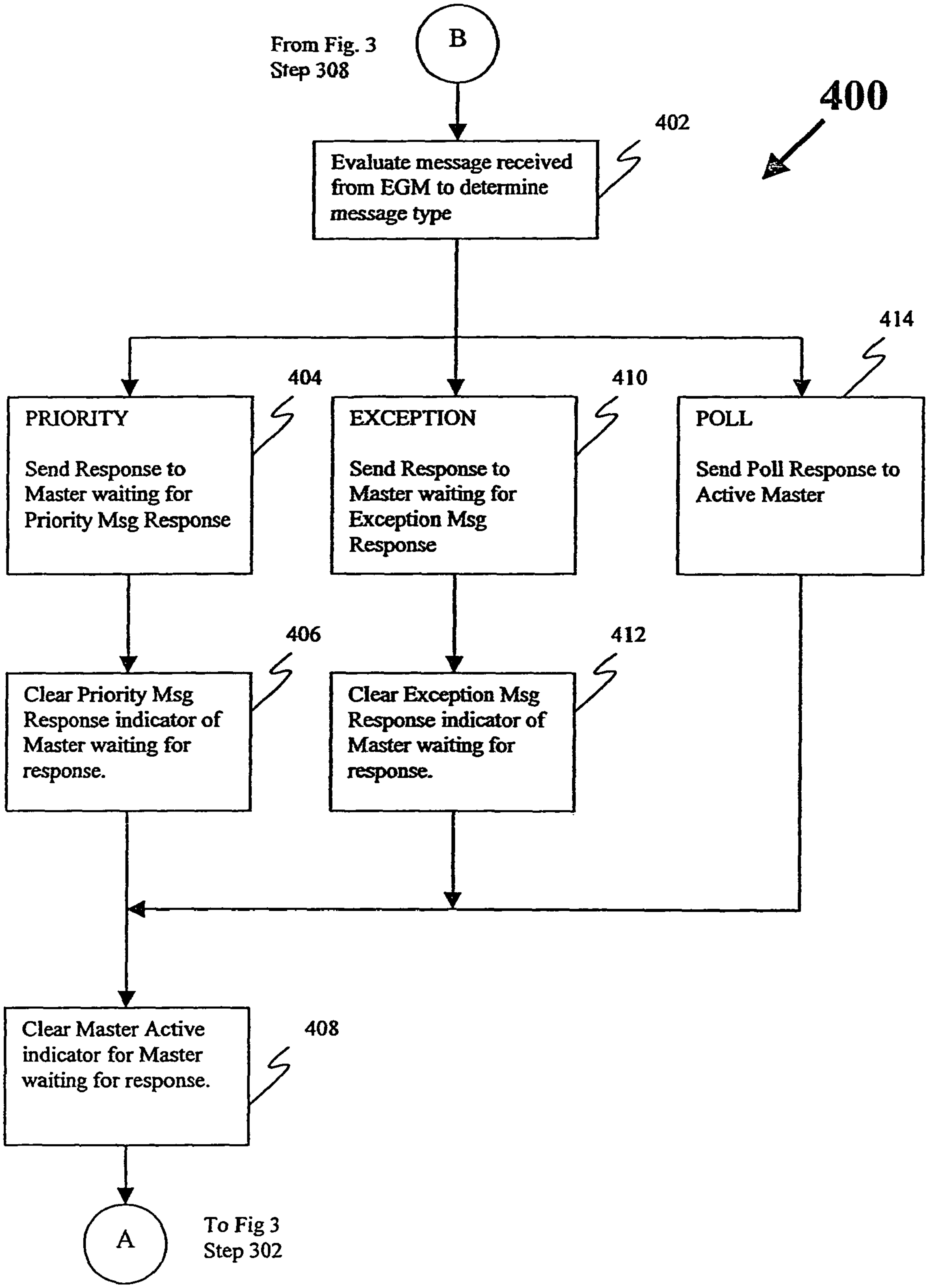
FIG. 4 is a flow diagram of message processing within the universal game module continued.

In operation and referring to FIGS. 1, 2 and 4, the method of message processing is designated by 400 from block 308 whereat the casino electronic gaming machine 102 message is first considered determining the type of message that has been received from casino electronic gaming machine 102. If it is a response to a priority message then the response is forwarded to the master controller that is waiting for the priority message response at step 404. The indication that a master controller is waiting for a priority response is cleared at block 406. Then master active indication of the master controller waiting for the priority response is cleared in step 408. This concludes the priority message response processing and the control returns to the universal game module 200 for further message processing by the method of FIG. 3 beginning a loop again with the method 300 to process the next received message.

If it is a response to an exception message then the response is forwarded to the master controller that is waiting for the exception message response at processing block 410. The indication that the master controller is waiting for an exception response is cleared at step 406 and the master active indicator for the master controller waiting for the exception response is cleared by step 408. This concludes the exception message response processing and the control returns to loop the universal game module 200 with the method of message processing function 300 of FIG. 3 whereat the next received message is considered.

If in FIG. 4 the evaluated message at step 402 is a response to a poll message then the response is forwarded to the active master controller that is waiting for the poll message response at block 414. The active master indication of the master controller that sent the poll is cleared by step 408. This concludes the poll message response processing and the control returns to the universal game module 200 with the method of message processing function 300 of FIG. 3 whereat the next received message is considered.

Figure 5:
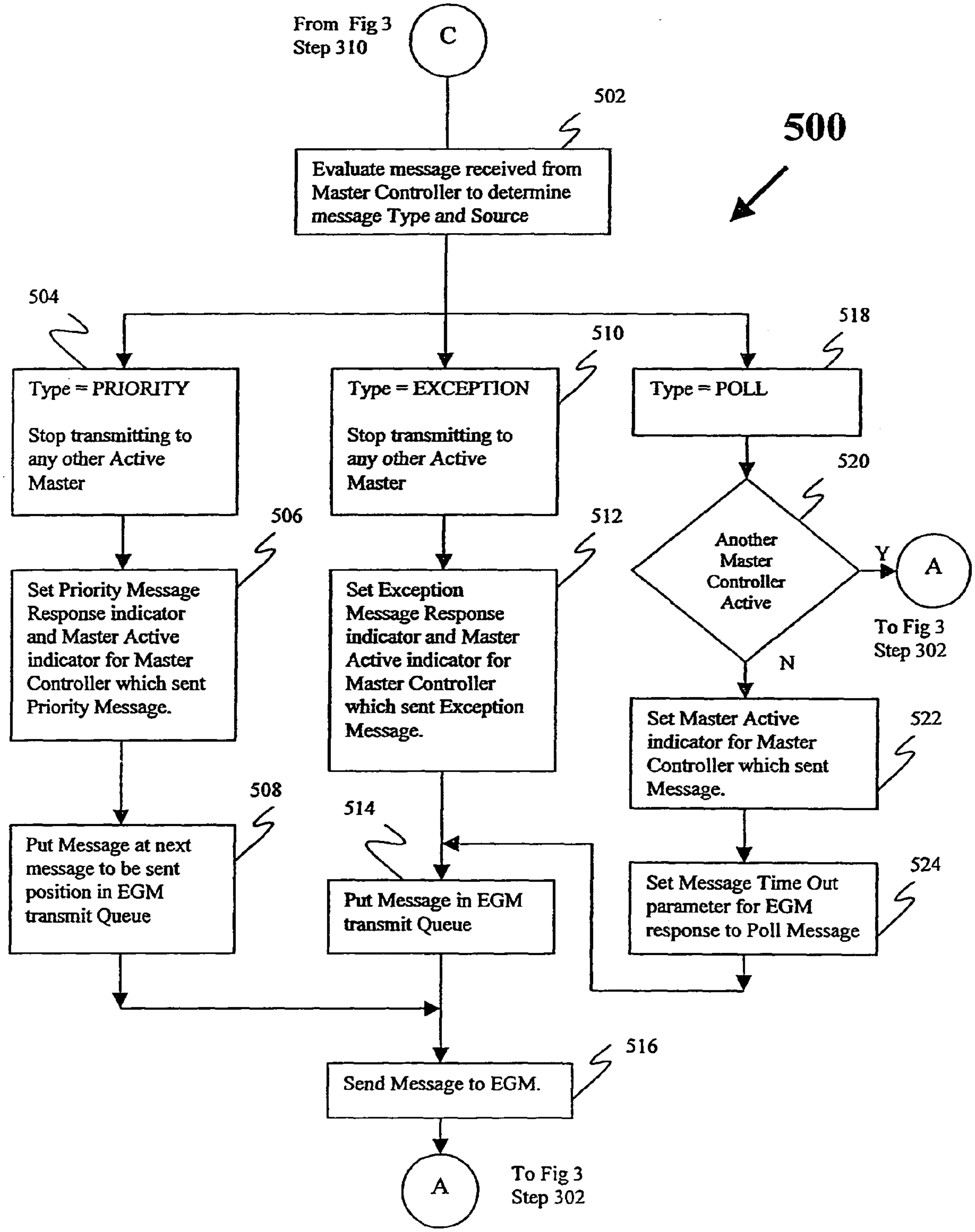
FIG. 5 is a flow diagram of message processing within the universal game module continued.

In operation and referring to FIGS. 1, 2 and 5, the method of master controller message processing 500 begins by determining the master controller that sent the message and the type of message sent with step 502. If it is a priority message then all message transmission to other active master controllers are terminated at block 504. The priority message response indicator and master active indicator are set for the master controller that sent the priority message with step 506. The priority message is then inserted into the transmit queue to the casino electronic gaming machine 102 so that it will be the next message sent by step 508. The message is then sent to the casino electronic gaming machine 102.

If the message is an exception message then all message transmission to other active master controllers are terminated with step 510. The exception message response indicator and master active indicator are set for the master controller that sent the exception message via step 512 of FIG. 5. The exception message is then inserted into the transmit queue to the casino electronic gaming machine 102 and the message is sent to thereto.

The largest amount of message traffic occurs via message polling. A polling message is sent from a master controller to a casino electronic gaming machine 102 on a period basis, typically at a rate of every 2/10 of a second up to every 5 seconds. The master controller typically asked for information about events that occur at the casino electronic gaming machine 102. One type of event could be that a Player has selected particular game to play. The casino electronic gaming machine 102 sends the response to the poll message to the master controller in an exception message indicating that the player has selected a particular game. If no event has occurred at the casino electronic gaming machine 102 then the universal game module 102 sends no response to the master controller. The universal game module 200 controls this normal mode of message traffic by means of a "First-In, First-Complete" method based upon which master controller is the active one. The master controller is the active controller if a message from it is processed and no other master controller is designated as the active controller and no priority or exception message is received from a casino electronic gaming machine or other master controller before the normal response message is received from a casino electronic gaming machine. If the message type is a normal poll message then step 518 is followed. The first check is to determine if another master controller is active with step 520. If there is another active master controller then the processing for this message will be returned to the universal game module 200 message processing method 300 of FIG. 3 at step 302 until the active master indicator for the other master controller has been cleared by a subsequent response message from a casino electronic gaming machine 102. When the system detects the condition that no other master controller is active it will set the master active indicator for that master controller, associated with this poll message with step 522. The message time out parameters for the casino electronic gaming machine 102 response for the poll message will then be set by step 524. The poll message is then inserted into the transmit queue to the casino electronic gaming machine 102 and the message is sent to another casino electronic gaming machine 102. Remembering that a group of casino electronic gaming machines can be served with two-way communication by the described method steps.

Figure 6:
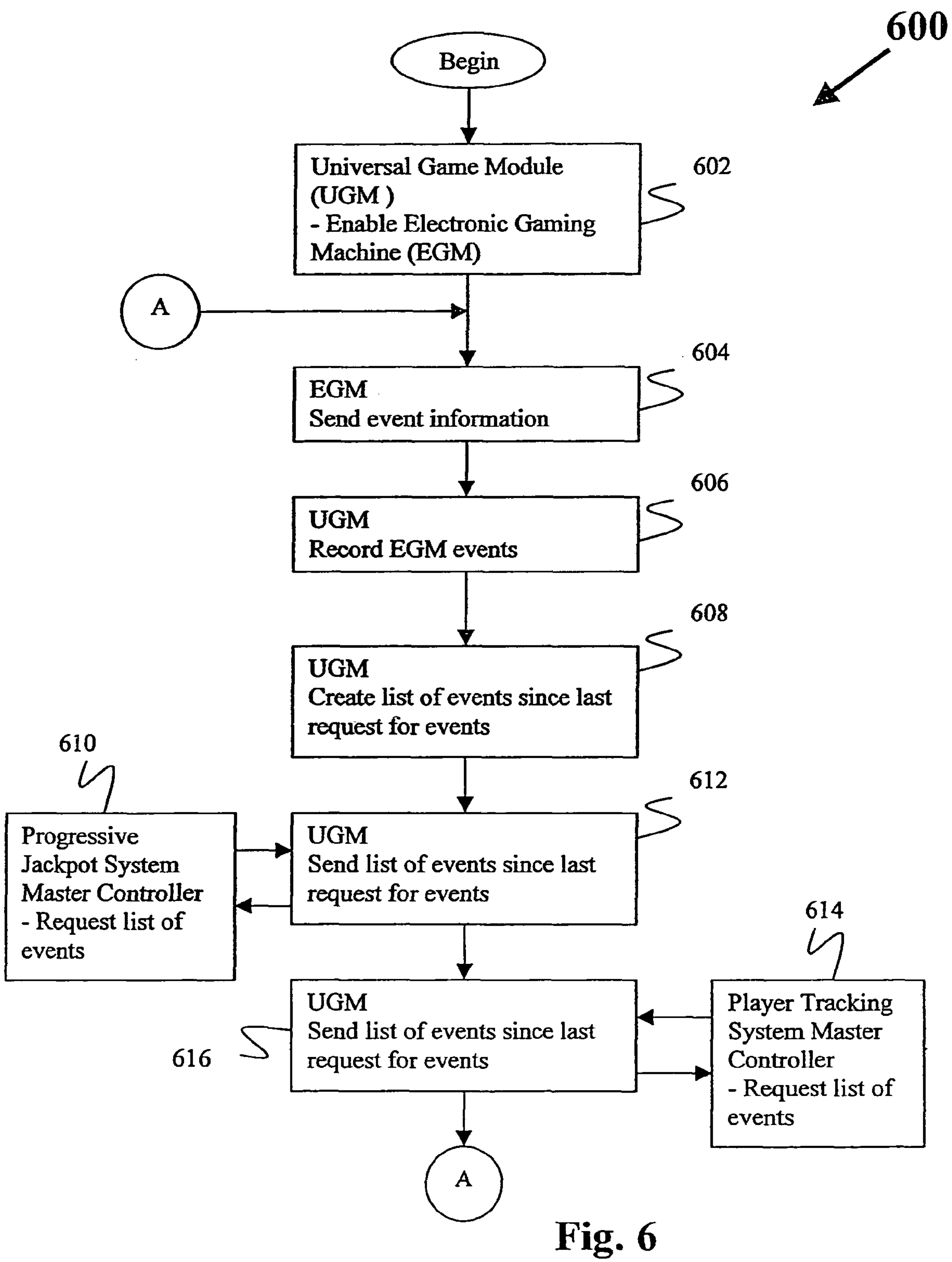
FIG. 6 is a flow diagram of communication processing between the universal game module and a casino electronic gaming machine and two casino master controllers.

In operation and referring to FIGS. 1, 2 and 6 the normal mode of operation of the gaming system communications 600 is described. The Communication cycle begins when the casino electronic gaming machine 102 is enabled 602 by the universal game module 200. The universal game module 200 will not enable the casino electronic gaming machine 102 until both master controllers, 108 and 110 are active. Once the casino electronic gaming machine 102 is enabled the universal game module 200 periodically sends messages 602 to the casino electronic gaming machine 102 requesting information concerning events at the casino electronic gaming machine 102. The casino electronic gaming machine 102 will then respond 604 with messages that contain information about individual events that have occurred since the last request was received from the universal game module 200. These events typically involve a player making a wager by inserting coins or bills, inserting a player tracking card, cashing out or award of a prize. It can also include status information such as printer jam, door open, coin hopper fill or other maintenance activities. The universal game module 200 records the events 606 as they occur. The universal game module 200 then creates a list of events 608 that have occurred at the casino electronic gaming machine 102 since the last request for events was received from either master controller 108 and 110.

In the normal mode of communications, a master controller, 108 or 110, will periodically request a list of events 610 that have occurred at the casino electronic gaming machine 102 since it's last request. The universal game module 200 will respond 612 with a list of the events. In a similar manner the other master controller, 108 or 110, will also periodically request a list of events 614 that occurred at the casino electronic gaming machine 102 since its last request. The universal game module 200 will respond 616 with the list of events that have occurred at the casino electronic gaming machine 102.

This cycle will continue as long as the casino electronic gaming machine 102 and both master systems, 108 and 110, are enabled.

Figure 7A:
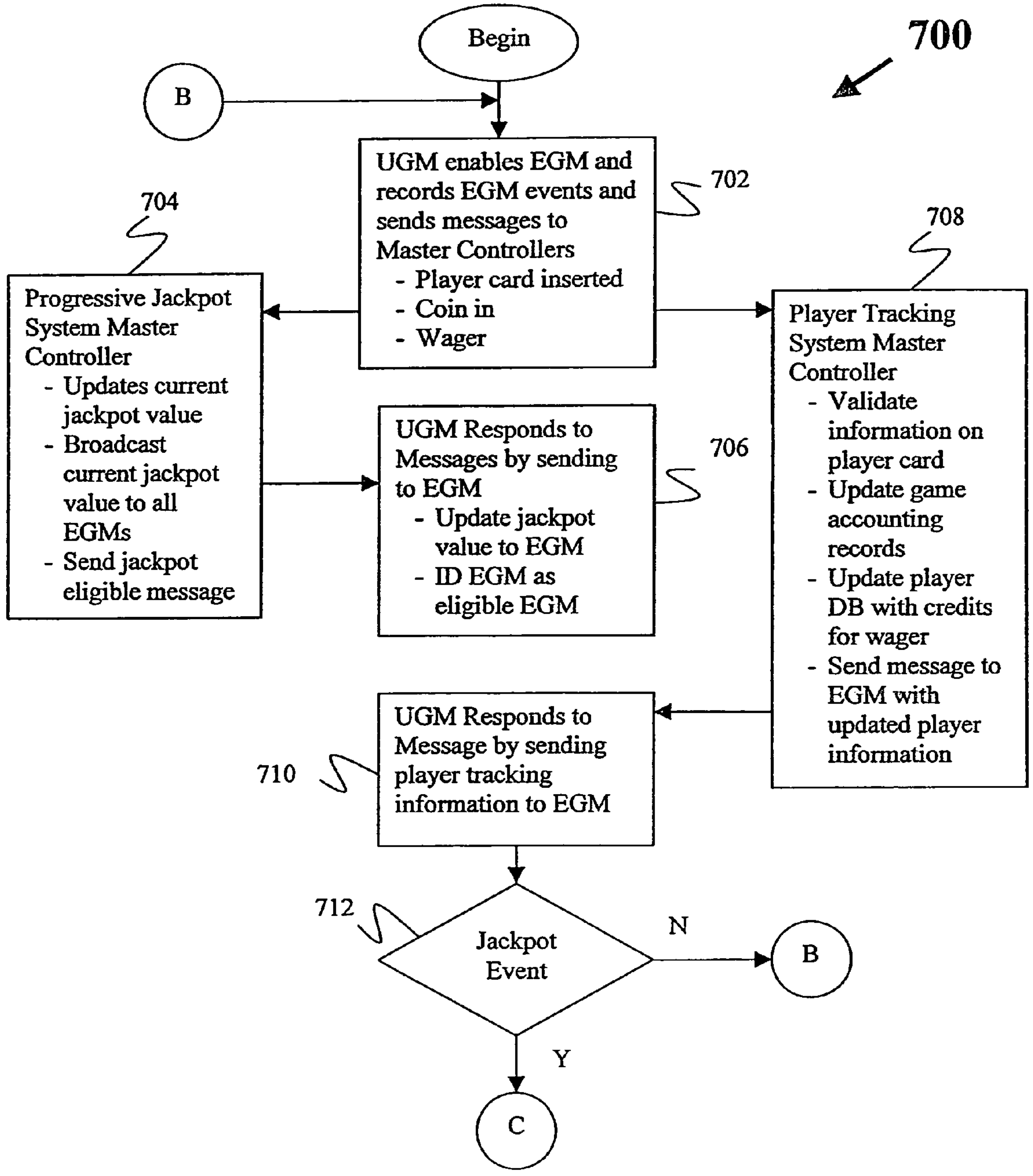
FIGS. 7*a* and 7*b* show a function flow diagram of event message processing between the universal game module and a casino electronic gaming machine and two casino master controllers.
Figure 7B:
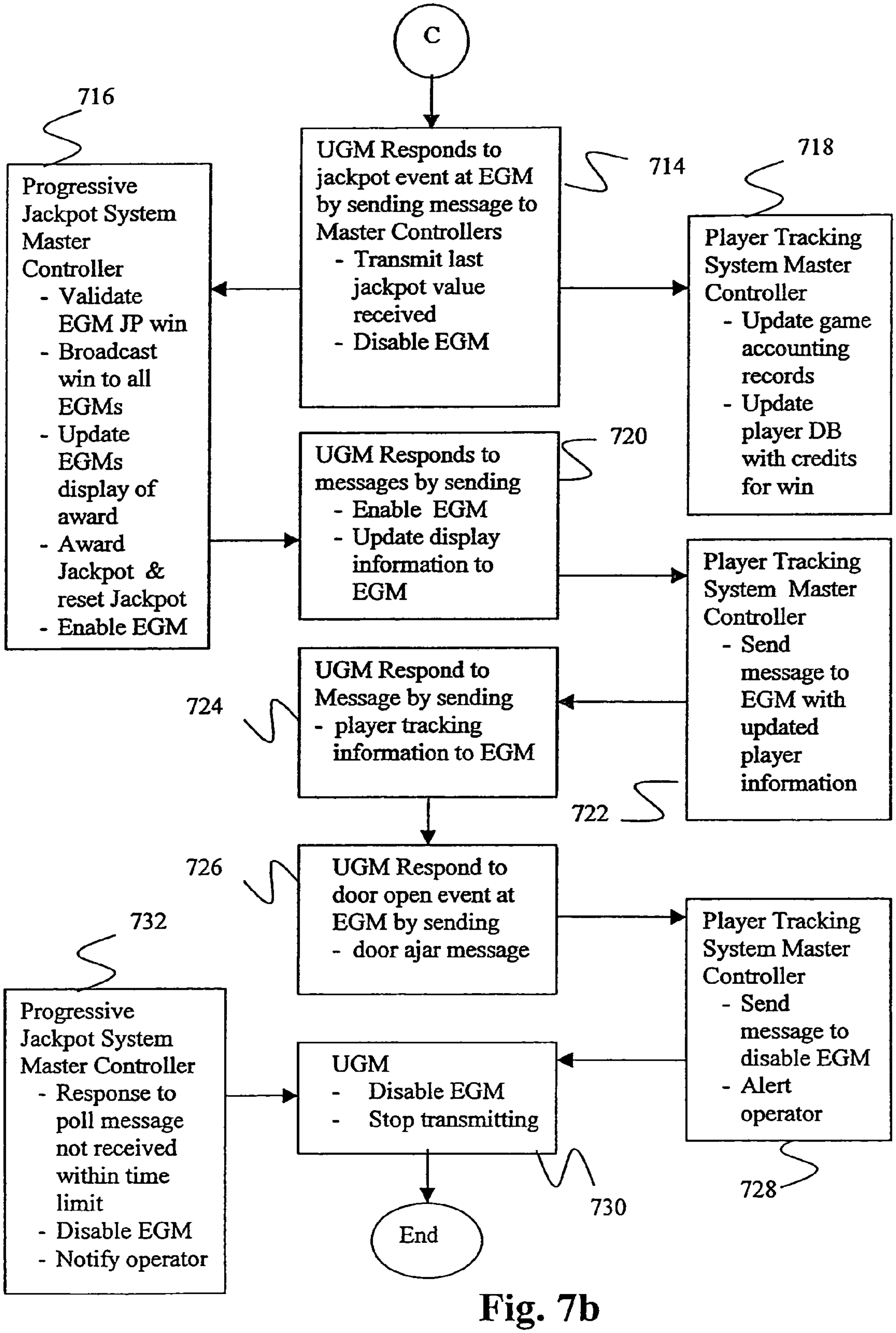

The example 700 shown in FIGS. 7*a* and 7*b* depict a typical wagering transaction wherein an abnormal event occurs. The example depicts how the universal game module 200 maintains normal communications between the master controllers, 108 and 110, and the casino electronic gaming machine 102 and how the universal game module 200 can recognize the priority of certain events and respond to them in a timely and efficient manner. The typical wagering event described is when a player inserts a player-tracking card into casino electronic gaming machine 102, inserts coins to play the game and makes a wager as shown in block 702.

In this example there are two master control systems within the casino that monitor this activity. The first system is the player tracking system 104 and the associated master controller 110. A typical player tracking system 104 would recognize and validate the information contained on a player's card and updated the player information as a result of wagers. The updated information would be displayed to the player at the casino electronic gaming machine 102. This system would also typically record the wager information into a casino accounting system. The second system, the progressive jackpot system, 106, and the associated master controller, 108, controls events associated with a progressive jackpot in FIGS. 1 and 2. Typically a number of casino electronic gaming machines 102 are linked into one progressive jackpot. The progressive jackpot system 106 information about wagers at each casino electronic gaming machine and a new jackpot value is calculated. The jackpot is incremented accordingly and becomes the current jackpot value. The current jackpot value is transmitted to each casino electronic gaming machine 102 and to displays at each casino electronic gaming machine and to a common progressive jackpot display. In this example the progressive jackpot system and the associated master controller, 108, defines which casino electronic gaming machines 102 are eligible to award a jackpot and monitors the casino electronic gaming machines 102 for the occurrence of a jackpot win. When a win occurs the progressive jackpot system 106 validates the win, notifies the other casino electronic gaming machines 102 of the win, awards the jackpot and resets the jackpot to an initial value.

The abnormal condition in used in this example is an unexpected occurrence of an open door detected by a casino electronic gaming machine 102. The event is recognized by the universal game module 200 and given priority over all other activity at the casino electronic gaming machine 102 and both master controllers 108 and 110 and the associated master control systems 104 and 106.

In operation and referring to FIGS. 1, 2, 7*a* and 7*b* the communication cycle 700 begins when the universal game module 200 enables the casino electronic gaming machine 102. The universal game module 200 will not enable each casino electronic gaming machine 102 until both master controllers 108 and 110 are active. Once the casino electronic gaming machine 102 is enabled the universal game module 200 periodically sends messages to the casino electronic gaming machine 102 which requests information concerning events at the casino electronic gaming machine 102. The casino electronic gaming machine 102 will then respond with messages that contain information about individual events that have occurred since the last request was received from the universal game module 200.

In this example 700 the event involve a player inserting a player-tracking card, and making a wager by inserting coins. The universal game module 200 records the events 702 as they occur and maintains a list of those events.

As a result of a normal request for events by the progressive jackpot master controller, 108, the universal game module 200 will send a list of the events 704 that occurred at the casino electronic gaming machine 102 to the progressive jackpot master controller 108. The progressive jackpot master controller, 108, will respond to the type of events by updating the current value of the jackpot, broadcasting the updated jackpot value to all casino electronic gaming machines 102. Also, selected casino electronic gaming machines 102 will also be sent a message indicating that the casino electronic gaming machine 102 is eligible for a jackpot win.

Upon the receipt of the messages from the progressive jackpot master controller, 108, each casino electronic gaming machine 102 will respond 706 by updating the jackpot value and identifying itself as eligible for a jackpot win.

Within approximately the same time period the player tracking system master controller, 110, will receive 708 from the universal game module the same list of events that have occurred at the casino electronic gaming machine 102. Because it has a completely different function it will respond to the events from the casino electronic gaming machine 102 in a different manner. For example it will validate the information contained on the player-tracking card and update the credits for the player as a result of the wager. It will update the game accounting records with the wager amount. It will also send an update of the player tracking information to the casino electronic gaming machine 102 for the local display.

In response to the message from the player tracking system master controller, 110, the universal game module 200 will forward 710 the player tracking information to the casino electronic gaming machine 102.

During the period of eligibility for a jackpot win the casino electronic gaming machine 102 will monitor player wagers 712 for a jackpot win. If there is no win then play will continue and wagering the forwarding of wager information to the universal game module 200 will continue 702. If there is a win at the casino electronic gaming machine 102 the universal game module 200 responds 714 to the event by forwarding the information to the master controllers, 108 and 110, and disabling the casino electronic gaming machine 102 from any further actions by the player Within approximately the same time period the player tracking system master controller, 110, will receive 718 from the universal game module 200 the same information about the jackpot win. Because it has a completely different function it will respond to the jackpot win information from the casino electronic gaming machine 102 in a different manner. For example it will update the credits for the jackpot win for the player as a result of the wager. It updates the game accounting records with the wager amount and jackpot win. Because the universal game module 200 has disabled the casino electronic gaming machine 102 from further action as a result of the jackpot win 714 the update of the player tracking information to the casino electronic gaming machine 102 for the local display will be sent as soon as the casino electronic gaming machine 102 has been enabled again.

The progressive jackpot system master controller, 108, will respond in FIG. 7*b*, 716 to the jackpot win event by validating the jackpot win, broadcasting the win information to the casino electronic gaming machines, 102, providing updated jackpot information for the displays, awarding the jackpot including setting the new jackpot to an initial value and enabling the casino electronic gaming machine 102 for continued play.

The universal game module 200 responds 720 to the messages from the progressive jackpot system master controller, 108, by enabling the casino electronic gaming machine 102 and sending the updated information to the casino electronic gaming machine 102 for display. Upon receipt of the change in status of the casino electronic gaming machine 102 to enable, the player tracking system master controller, 110, sends 722 the updated player information to the casino electronic gaming machine 102. In response to the updated player information the universal game module 200 forwards 724 forwards the information to the casino electronic gaming machine 102 for local display update.

An abnormal event occurs at the casino electronic gaming machine, 102, which detected that a door on the machine is open. The universal game module 200 receives 726 the indication of an open door as a result of next request for event information. In response the universal game module 200 immediately transmits the event information to the player tracking system master controller 110. The player tracking system master controller 110 evaluates the open door condition and determines that it is not an authorized event and immediately sends a message 728 to disable the casino electronic gaming machine 102 and alerts the casino operator of the abnormal event. Upon receipt of the disable message the universal game module 200 disables 730 the casino electronic gaming machine 102. The universal game module 200 also stops all further transmissions to the casino electronic gaming machine 102 and master controllers 108 and 110. The progressive jackpot system master controller, 108, recognizes the lack of message transmission 732 and issues a disable command to the casino electronic gaming machine 102 and notifies the casino operator of the loss of communications to the casino electronic gaming machine 102.

From this point forward manual intervention on the part of casino personal is required to correct the abnormal situation of an unauthorized open door. Typically a floor technician will be dispatched to investigate the abnormal situation.

The following example describes a method of game play wherein a casino can award one or more progressive jackpots in a system with a casino master controller linked to a diverse variety of casino electronic gaming machines The method utilizes the universal game module to link together diverse electronic gaming machines. This allows for all the networked electronic gaming machines to be eligible for the award of one or more progressive jackpots without the constraint of only like gaming machines being eligible for progressive jackpot awards.

The progressive controller first identifies each of the casino electronic gaming machines networked to the progressive controller by the type of game, denomination and other game play criteria.

The games are networked to the progressive controller by means of a universal game module or a direct connection depending on the type of game machine. For those games that have only one slot accounting system connector, a universal game module is installed. The universal game module described in this invention provides concurrent communications between a casino electronic game equipped with only one slot account system connector and two or more diverse casino master control systems. In this example the two diverse master control systems are the progressive jackpot control system and the player tracking control system. Casino electronic gaming machines that have more than one physical slot accounting connector may be networked with other master control systems with or without using the universal game module as determined by casino operations.

The normal game play cycle begins when any one of the electronic gaming machines accepts wagers for play of a game. The electronic gaming machine communicates to each networked master control systems the outcome of the game. The game outcome is dependent upon the rules of play at each of the casino electronic gaming machines.

Periodically the progressive master controller will send to all the networked electronic gaming machines the current jackpot amount of one or more progressive jackpots and the designation of the eligibility of each electronic gaming machine to win a jackpot. One method of determining eligible electronic gaming machines is for the progressive control system to designate a certain percentage of all networked electronic gaming machines to be eligible for a period of time. That time period may be fixed, variable or established using any variety of criteria such as operating hours of the casino property. Another method of changing the eligibility criteria is for the selected electronic gaming machines to remain eligible until the progressive jackpot exceeds a predetermined amount.

If game play results in a win of a progressive prize, the electronic gaming machine transmits the event to the progressive jackpot control along with the last jackpot value it received from the progressive jackpot control system. The progressive jackpot control system calculates the jackpot amount to be awarded and transmits that amount to the eligible electronic gaming machine. It also notifies all other electronic gaming machines in the progressive network and reset the jackpot to an initial amount. The game play cycle then begins again.

While several examples illustrating different options for equalizing the different gaming machines in a progressive group are explained throughout the preceding disclosure, skilled artisans will appreciate that many variations of the execution will be possible. The specific example of improving the volatility should not be considered limiting and the particular apparatus and method disclosed merely one form. The claim that follow seek to cover alternatives that produce the desired capability to have different games on the same progressive having a frequent jackpot pay that is relatively high.

We claim:

1. A method that provides concurrent communications of a wide area progressive system and a player tracking system and each of a plurality of casino electronic gaming machines using a respective universal game device coupled within a respective one of the plurality of casino electronic gaming machines, said method comprising:

configuring communications with at least one processor in the respective universal game device to provide two-way message communication between the wide area progressive system and the player tracking system and each of the plurality of casino electronic gaming machines, wherein the respective universal game device of the respective one of the plurality of casino electronic gaming machines is configured to:

identify a receipt of a plurality of messages received from the wide area progressive system and the player tracking system by the at least one processor;

evaluate a message source of the plurality of messages by the at least one processor, the message source being at least one of the following: the wide area progressive system and the player tracking system;

evaluate a message type of the plurality of messages by the at least one processor, the message type being a command received from at least one of the following: the wide area progressive system and the player tracking system;

establish, by the at least one processor, a level of importance of each of the plurality of messages based on the source of each of the plurality of messages and the type of each of the plurality of messages;

establish, by the at least one processor, a message sequence precedence based on the source of each of the plurality of messages and the type of each of the plurality of messages, the message sequence precedence giving a higher transmission priority to a message of the plurality of messages having a level of importance above a predefined importance level with respect to the level of importance of the other of the plurality of messages having a level of importance below the predefined importance level;

use the at least one processor to prioritize the two-way message communication transmission from the wide area progressive system and the player tracking system to the respective one of the plurality of casino electronic gaming machines, and subsequently back to the wide area progressive system and the player tracking system based on the message sequence precedence; and enable an execution of two-way message communication transmission of the message having the higher transmission priority.

2. The method of claim 1 further comprising configuring the communications between each of the plurality of casino electronic gaming machines using at least an RS232C connector coupled to the universal game device.

3. The method of claim 1 further comprising configuring the communications using a slot accounting system message protocol in the plurality of casino electronic gaming machines.

4. The method of claim 1 further comprising equipping at least one of the wide area progressive system and the player tracking system with a slot accounting system by using an RS422 connector.

5. The method of claim 1 further comprising configuring the communications using at least a slot accounting system message protocol in at least one of the wide area progressive system and the player tracking system.

6. The method of claim 1 wherein configuring the communications comprises configuring the communications with the at least one processor to provide two-way message communication using at least a slot accounting system message protocol.

* * * * *